US011380907B2

(12) United States Patent
Yano et al.

(10) Patent No.: US 11,380,907 B2
(45) Date of Patent: Jul. 5, 2022

(54) SUBSTRATE STAINLESS STEEL SHEET FOR FUEL CELL SEPARATORS AND PRODUCTION METHOD THEREFOR (71) Applicant: JFE STEEL CORPORATION, Tokyo (JP)

(72) Inventors: Takayoshi Yano, Tokyo (JP); Shin Ishikawa, Tokyo (JP)

( * ) Notice: Subject to any disclaimer, the term of this patent is extended or adjusted under 35 U.S.C. 154(b) by 131 days.

(21) Appl. No.: 16/483,147

(22) PCT Filed: Jan. 25, 2018

(86) PCT No.: PCT/JP2018/002320
§ 371 (c)(1),
(2) Date: Aug. 2, 2019

(87) PCT Pub. No.: WO2018/147087
PCT Pub. Date: Aug. 16, 2018

(65) Prior Publication Data
US 2020/0227760 A1    Jul. 16, 2020

(30) Foreign Application Priority Data

Feb. 9, 2017  (JP) .............................. JP2017-022047

(51) Int. Cl.
*H01M 8/021*   (2016.01)
*C21D 1/76*    (2006.01)
(Continued)

(52) U.S. Cl.
CPC .............. *H01M 8/021* (2013.01); *C21D 1/76* (2013.01); *C21D 6/002* (2013.01); *C22C 38/18* (2013.01); *C23C 8/14* (2013.01); *H01M 8/0228* (2013.01)

(58) Field of Classification Search
CPC ....... H01M 8/0202–021; H01M 8/0223–0232; C21D 1/74–773; C21D 6/00–02; C22C 38/18
See application file for complete search history.

(56) References Cited

U.S. PATENT DOCUMENTS 5,698,337 A    12/1997  Nitschke et al.
6,379,476 B1 *  4/2002  Tarutani ............. H01M 8/0206
                                                    134/41

(Continued)

FOREIGN PATENT DOCUMENTS

CN    1271027 A    10/2000
CN   101510611 A    8/2009
(Continued)

OTHER PUBLICATIONS

Machine Translation of Matsuno et al. JP 2000-277133. Originally published Oct. 6, 2000 (Year: 2000).*

(Continued)

*Primary Examiner* — Jonathan Crepeau
*Assistant Examiner* — Jacob Buchanan
(74) *Attorney, Agent, or Firm* — Kenja IP Law PC (57) ABSTRACT A substrate stainless steel sheet has [chemical form other than metal (Cr+Fe)]/[metal form (Cr+Fe)] of 12.0 or more and 200 or less, [chemical form other than metal (Cr+Fe)]/[metal form (Cr+Fe)] being a ratio of a total of Cr and Fe existing in chemical form other than metal to a total of Cr and Fe existing in metal form at a substrate stainless steel sheet surface.

8 Claims, 2 Drawing Sheets

Fe 2p spectrum (51) Int. Cl.
*C21D 6/00* (2006.01)
*C22C 38/18* (2006.01)
*H01M 8/0228* (2016.01)
*C23C 8/14* (2006.01)

(56) References Cited

U.S. PATENT DOCUMENTS

| | | | | |
|---|---|---|---|---|
| 6,682,963 | B2* | 1/2004 | Ishikawa | G02F 1/1368 438/149 |
| 6,893,765 | B1* | 5/2005 | Nishida | H01M 8/241 429/513 |
| 8,778,566 | B2 | 7/2014 | Jeon et al. | |
| 8,785,080 | B2 | 7/2014 | Abd Elhamid et al. | |
| 9,531,014 | B2 | 12/2016 | Nagoshi et al. | |
| 2005/0037212 | A1* | 2/2005 | Budinski | H01M 8/0221 429/492 |
| 2006/0124907 | A1* | 6/2006 | Takada | C23C 2/40 252/500 |
| 2008/0236710 | A1* | 10/2008 | Rakowski | C23C 8/10 148/606 |
| 2009/0181283 | A1* | 7/2009 | Sato | C23C 14/165 429/432 |
| 2009/0269649 | A1* | 10/2009 | Jeon | C21D 9/0068 429/434 |
| 2010/0035118 | A1* | 2/2010 | Sato | H01M 8/0228 204/192.15 |
| 2011/0159397 | A1 | 6/2011 | Kaminaka et al. | |
| 2013/0040220 | A1* | 2/2013 | Kim | C22C 38/24 429/468 |
| 2014/0154129 | A1 | 6/2014 | Makiishi et al. | |

FOREIGN PATENT DOCUMENTS

| | | | | |
|---|---|---|---|---|
| CN | 102484261 | A | 5/2012 | |
| CN | 103717769 | A | 4/2014 | |
| CN | 103959524 | A | 7/2014 | |
| CN | 104393315 | A | 3/2015 | |
| EP | 3470540 | A1 | 4/2019 | |
| JP | S6431956 | A | 2/1989 | |
| JP | H0533116 | A | 2/1993 | |
| JP | 2517727 | B * | 7/1996 | C23C 8/18 |
| JP | H08180883 | A | 7/1996 | |
| JP | H08295999 | A | 11/1996 | |
| JP | H10228914 | A | 8/1998 | |
| JP | 2000277133 | A * | 10/2000 | H01M 8/02 |
| JP | 2000323152 | A | 11/2000 | |
| JP | 2003193206 | A | 7/2003 | |
| JP | 2004124197 | A | 4/2004 | |
| JP | 2008285731 | A | 11/2008 | |
| JP | 2011246778 | A | 12/2011 | |
| JP | 2012177157 | A | 9/2012 | |
| JP | 2013501340 | A | 1/2013 | |
| JP | 2013028849 | A | 2/2013 | |
| WO | 2017212906 | A1 | 12/2017 | |

OTHER PUBLICATIONS

Machine translation of Shimizu et al., JP H0533116. Originally published Feb. 9, 1993. (Year: 1993).*
Machine Translation of Oomi et al. (JP 2517727B). Originally available Jul. 24, 1996 (Year: 1996).*
Sep. 22, 2020, Office Action issued by the Korean Intellectual Property Office in the corresponding Korean Patent Application No. 10-2019-7022721 with English language concise statement of relevance.
Jan. 9, 2020, the Extended European Search Report issued by the European Patent Office in the corresponding European Patent Application No. 18751687.7.
Apr. 24, 2018, International Search Report issued in the International Patent Application No. PCT/JP2018/002320.
Mar. 10, 2021, Office Action issued by the Korean Intellectual Property Office in the corresponding Korean Patent Application No. 10-2019-7022721 with English language concise statement of relevance.
Nov. 30, 2021, Office Action issued by the China National Intellectual Property Administration in the corresponding Chinese Patent Application No. 201880009914.0 with English language search report.
Apr. 18, 2022, Office Action issued by the China National Intellectual Property Administration in the corresponding Chinese Patent Application No. 201880009914.0 with English language search report.

* cited by examiner

FIG. 1

Fe 2p spectrum

FIG. 2

Cr 2p spectrum

SUBSTRATE STAINLESS STEEL SHEET FOR FUEL CELL SEPARATORS AND PRODUCTION METHOD THEREFOR

TECHNICAL FIELD

The disclosure relates to a substrate stainless steel sheet for fuel cell separators and a production method therefor.

BACKGROUND

In recent years, fuel cells that have excellent generation efficiency and emit no $CO_2$ are being developed for global environment protection. Such a fuel cell generates electricity from $H_2$ and $O_2$ through an electrochemical reaction. The fuel cell has a sandwich-like basic structure, and includes an electrolyte membrane (ion-exchange membrane), two electrodes (fuel electrode and air electrode), gas diffusion layers of $O_2$ (air) and $H_2$, and two separators (bipolar plates).

Fuel cells are classified as phosphoric acid fuel cells, molten carbonate fuel cells, solid oxide fuel cells, alkaline fuel cells, and polymer electrolyte fuel cells (PEFC: proton-exchange membrane fuel cells or polymer electrolyte fuel cells) according to the type of electrolyte membrane used, which are each being developed.

Among those fuel cells, polymer electrolyte fuel cells are particularly expected to be used as power sources in electric vehicles, home or industrial stationary generators, and portable small generators.

A polymer electrolyte fuel cell extracts electricity from $H_2$ and $O_2$ via a polymer membrane. A membrane-electrode joined body is sandwiched between gas diffusion layers (for example, carbon paper) and separators (bipolar plates), forming a single component (a single cell). An electromotive force is generated between the separator on the side of a fuel electrode and the separator on the side of an air electrode.

The membrane-electrode joined body is called a membrane-electrode assembly (MEA). The membrane-electrode joined body is an assembly of a polymer membrane and an electrode material such as carbon black carrying a platinum catalyst on the front and back surfaces of the membrane, and has a thickness of several 10 μm to several 100 μm. The gas diffusion layers are often integrated with the membrane-electrode joined body.

In the case of actually using polymer electrolyte fuel cells, several tens to hundreds of single cells such as the above are typically connected in series to form a fuel cell stack and put to use.

The separators are required to function not only as (a) partition walls separating single cells, but also as (b) conductors carrying generated electrons, (c) air passages through which $O_2$ (air) flows and hydrogen passages through which $H_2$ flows, and (d) exhaust passages through which generated water or gas is exhausted (the air passages or the hydrogen passages also serve as the exhaust passages).

The separators therefore need to have excellent durability and electric conductivity.

The durability depends on corrosion resistance since if metal ions are eluted due to separator corrosion, the proton conductivity of the polymer membrane (electrolyte membrane) decreases to degrade power generation property.

Regarding electric conductivity (conductivity), the contact resistance between the separator and the gas diffusion layer is desirably as low as possible, because an increase in contact resistance between the separator and the gas diffusion layer lowers generation efficiency of the polymer electrolyte fuel cell. A low contact resistance between the separator and the gas diffusion layer contributes to better power generation property.

Polymer electrolyte fuel cells using graphite as separators have already been in practical use. The separators made of graphite are advantageous in that the contact resistance is relatively low and also corrosion does not occur. The separators made of graphite, however, easily break on impact, and so are disadvantageous in that the size reduction is difficult and the processing cost for forming gas flow passages is high. These drawbacks of the separators made of graphite prevent the widespread use of polymer electrolyte fuel cells.

Attempts have been made to use a metal material as the separator material instead of graphite. In particular, various studies have been conducted to commercialize separators made of stainless steel, titanium, a titanium alloy, or the like for enhanced durability.

For example, JP H8-180883 A (PTL 1) discloses a technique of using, as separators, a metal such as stainless steel or a titanium alloy that easily forms a passive film. With the technique disclosed in PTL 1, however, the formation of the passive film causes an increase in contact resistance, and leads to lower generation efficiency. The metal material disclosed in PTL 1 thus has problems such as high contact resistance as compared with the graphite material.

JP H10-228914 A (PTL 2) discloses a technique of plating the surface of a metal separator such as an austenitic stainless steel sheet (SUS304) with gold to reduce the contact resistance and ensure high output. Gold plating, however, has a problem such as an increase in cost.

CITATION LIST

Patent Literatures

PTL 1: JP H8-180883 A
PTL 2: JP H10-228914 A
PTL 3: JP 2013-501340 A
PTL 4: JP 2013-28849 A

SUMMARY

Technical Problem

With regard to such problems, PTL 3 discloses a technique of forming a discontinuous coating film of gold (Au) on a substrate stainless steel surface so as to decrease the usage of Au, and for the purpose of securing corrosion resistance, subjecting to heat treatment under predetermined conditions a part on which the coating film is not formed, that is, a part on which the substrate stainless steel is exposed, thereby forming an oxide layer.

A metal plate obtained by the technique disclosed in PTL 3, however, has proved to be insufficient in corrosion resistance in the case that the metal plate is applied with higher potential in a separator use environment. Further, the heat treatment time is so long such as ten minutes to three hours that the technique of PTL 3 has a problem in terms of manufacturability and manufacturing cost.

PTL 4 discloses a technique of immersing stainless steel in a solution containing hydrofluoric acid to thereby reform the surface condition of the stainless steel, more particularly, adding F on a stainless steel sheet surface and setting a ratio of chemical form other than metal (Cr+Fe)/metal chemical form (Cr+Fe) at 3.0 or more to thereby reduce contact resistance.

A treatment liquid containing fluorine ion such as hydrofluoric acid, however, has extremely high chemical activity and causes a safety problem during treatment. The disposal of waste liquid discharged after treatment also causes a safety problem.

It could therefore be helpful to provide at low cost and in safety a substrate stainless steel sheet for fuel cell separators having both excellent corrosion resistance in a fuel cell separator use environment and low contact resistance.

It could also be helpful to provide a production method for the substrate stainless steel sheet for fuel cell separators.

The substrate stainless steel sheet is a stainless steel sheet serving as a substrate of a conductive coating. The substrate stainless steel sheet has a conductive coating on its surface to serve as fuel cell separators.

Solution to Problem

We conducted extensive examination to solve the aforementioned problems. The stainless steel has a passive film (hereafter, also referred to as surface layer) mainly made of oxide and hydroxide of Fe and Cr, and such a surface layer ensures corrosion resistance in a fuel cell separator environment.

We attempted to thicken a surface layer of a stainless steel sheet so as to obtain sufficient corrosion resistance even in the case that the stainless steel sheet is applied with higher potential in a separator use environment. We thus examined various processes to thicken a surface layer of a stainless steel sheet.

As a result, we arrived at an idea that subjecting a stainless steel to heat treatment in an oxygen atmosphere to form a surface layer is optimum in terms of safety and manufacturability.

We, however, could not obtain a stainless steel sheet with a surface layer sufficiently thickened in a short time even though the surface layer was formed in the heat treatment temperature described in PTL 3.

We accordingly examined the heat treatment conditions further based on the result of the examination, and then discovered that increasing the heat treatment temperature, more particularly, subjecting a stainless steel sheet to heat treatment of holding in an atmosphere containing 1 vol. % or more oxygen and in a temperature range of 350° C. or more to 750° C. or less can thicken the surface layer of a stainless steel sheet in a short time.

We conducted the above-noted heat treatment to make stainless steel sheets with a surface layer of various thicknesses and further researched and examined corrosion resistance and contact resistance of those stainless steel sheets.

As a result, we discovered that (1) when [chemical form other than metal (Cr+Fe)]/[metal chemical form (Cr+Fe)] which is a ratio of a total atomic concentration of Cr and Fe existing in chemical form other than metal to a total atomic concentration of Cr and Fe existing in metal chemical form at a stainless steel sheet surface is controlled within a range of 12.0 or more to 200 or less, desired corrosion resistance is ensured, and (2) when [chemical form other than metal (Cr+Fe)]/[metal chemical form (Cr+Fe)] is controlled within a range of 12.0 or more to 200 or less and a conductive coating is provided on the stainless steel surface, good contact resistance is obtained not only when the conductive coating is Au but also when the conductive coating of Au is extremely thinned to a nm order and a conductive coating other than Au is used, for example a conductive coating of a predetermined metal layer, metal carbide layer, metal nitride layer, carbon material layer, conductive polymer layer, or organic resin layer containing a conductive substance. Thus, we have developed the present disclosure.

As to a reason why controlling [chemical form other than metal (Cr+Fe)]/[metal chemical form (Cr+Fe)] within a range of 12.0 or more to 200 or less allows the compatibility between excellent corrosion resistance in a fuel cell separator use environment and low contact resistance, we consider as follows.

The fuel cell separator contacts the gas diffusion layer made of a carbon paper, a carbon cloth, or the like, while a predetermined load is applied. A surface layer of the stainless steel sheet causes an increase in contact resistance. However, when the heat treatment conditions are adjusted to properly control the thickness of the surface layer, and thus control [chemical form other than metal (Cr+Fe)]/[metal chemical form (Cr+Fe)] while the predetermined load is applied to the gas diffusion layer, the surface layer is broken just under a conductive coating which directly contacts the gas diffusion layer made of a carbon paper, a carbon cloth, or the like. This forms a contact point at which the conductive coating directly contacts a steel substrate part of the stainless steel and ensures low contact resistance. Since the load is not applied to a conductive coating which does not directly contact the gas diffusion layer made of a carbon paper, a carbon cloth, or the like, the surface layer is not broken on the steel substrate part of the stainless steel sheet. Thus, excellent corrosion resistance can be maintained in a separator use environment.

As a result, the compatibility is realized between excellent corrosion resistance in a fuel cell separator use environment and low contact resistance. The disclosure is based on the above-mentioned discoveries.

We thus provide:

1. A substrate stainless steel sheet for fuel cell separators, wherein the substrate stainless steel sheet has [chemical form other than metal (Cr+Fe)]/[metal chemical form (Cr+Fe)] of 12.0 or more and 200 or less, [chemical form other than metal (Cr+Fe)]/[metal chemical form (Cr+Fe)] being a ratio of a total of Cr and Fe existing in chemical form other than metal to a total of Cr and Fe existing in metal chemical form at a substrate stainless steel sheet surface (a surface of the substrate stainless steel sheet), and wherein [metal chemical form (Cr+Fe)] is a total atomic concentration of Cr and Fe existing in metal chemical form and [chemical form other than metal (Cr+Fe)] is a total atomic concentration of Cr and Fe existing in chemical form other than metal, which are measured by analyzing the substrate stainless steel sheet surface by X-ray photoelectron spectroscopy.

2. A production method for a substrate stainless steel sheet for fuel cell separators, comprising:

preparing a stainless steel sheet as a material; and subjecting the stainless steel sheet to heat treatment of holding in an atmosphere containing 1 vol. % or more oxygen and in a temperature range of 350° C. or more to 750° C. or less for 1 second or more and 10 minutes or less to thereby set [chemical form other than metal (Cr+Fe)]/[metal chemical form (Cr+Fe)] at 12.0 or more and 200 or less, [chemical form other than metal (Cr+Fe)]/[metal chemical form (Cr+Fe)] being a ratio of a total of Cr and Fe existing in chemical form other than metal to a total of Cr and Fe existing in metal chemical form at a stainless steel sheet surface (a surface of the stainless steel sheet), wherein [metal chemical form (Cr+Fe)] is a total atomic concentration of Cr and Fe existing in metal chemical form and [chemical form other than metal (Cr+Fe)] is a total atomic concentration of Cr and Fe existing in chemical form other than metal, which are measured by analyzing the stainless steel sheet surface after heat treatment by X-ray photoelectron spectroscopy.

Advantageous Effect

It is possible to obtain a substrate stainless steel sheet for fuel cell separators having both excellent corrosion resistance in a fuel cell separator use environment and low contact resistance at low cost and in safety. The use of the substrate stainless steel sheet makes it possible to produce a fuel cell separator with good corrosion resistance and conductivity.

BRIEF DESCRIPTION OF THE DRAWINGS

In the accompanying drawings.

DETAILED DESCRIPTION

The present disclosure will be described in detail below.
(1) Substrate stainless steel sheet for fuel cell separators (Substrate stainless steel sheet for a steel sheet of fuel cell separators)
A presently disclosed substrate stainless steel sheet for fuel cell separators has [chemical form other than metal (Cr+Fe)]/[metal chemical form (Cr+Fe)] of 12.0 or more and 200 or less, [chemical form other than metal (Cr+Fe)]/[metal chemical form (Cr+Fe)] being a ratio of a total of Cr and Fe existing in chemical form other than metal to a total of Cr and Fe existing in metal chemical form at a substrate stainless steel sheet surface.

[metal chemical form (Cr+Fe)] is a total atomic concentration of Cr and Fe existing in metal chemical form and [chemical form other than metal (Cr+Fe)] is a total atomic concentration of Cr and Fe existing in chemical form other than metal, which are measured by analyzing the substrate stainless steel sheet surface by X-ray photoelectron spectroscopy.

[Chemical Form Other Than Metal (Cr+Fe)]/[Metal Chemical Form (Cr+Fe)]: 12.0 or More and 200 or Less As noted above, controlling [chemical form other than metal (Cr+Fe)]/[metal chemical form (Cr+Fe)] at the substrate stainless steel sheet surface in a range of 12.0 or more to 200 or less allows the compatibility between excellent corrosion resistance in a fuel cell separator use environment and low contact resistance. [chemical form other than metal (Cr+Fe)]/[metal chemical form (Cr+Fe)] is preferably 30.0 or more, and more preferably 50.0 or more. [chemical form other than metal (Cr+Fe)]/[metal chemical form (Cr+Fe)] is preferably 150 or less, and more preferably 100 or less.

In the case that [chemical form other than metal (Cr+Fe)]/[metal chemical form (Cr+Fe)] is less than 12.0, the substrate stainless steel sheet has a surface layer of insufficient thickness and suffers degradation in protection properties in a separator use environment, which makes it difficult to ensure desired corrosion resistance.

In the case that [chemical form other than metal (Cr+Fe)]/[metal chemical form (Cr+Fe)] is more than 200, the substrate stainless steel sheet has an excessively thick surface layer, which makes it difficult to ensure desired contact resistance.

The chemical form other than metal denotes oxide and hydroxide. In detail, for Cr, examples include $CrO_2$, $Cr_2O_3$, CrOOH, $Cr(OH)_3$, and $CrO_3$. For Fe, examples include FeO, $Fe_3O_4$, $Fe_2O_3$, and FeOOH.

[Chemical Form Other Than Metal (Cr+Fe)]/[Metal Chemical Form (Cr+Fe)] is Determined as Follows.

The steel sheet surface is measured by X-ray photoelectron spectroscopy (hereafter also referred to as "XPS"), and the obtained peaks of Cr and Fe are separated into the peaks of Cr and Fe existing in metal chemical form and the peaks of Cr and Fe existing in chemical form other than metal. Dividing the total atomic concentration of Cr and Fe existing in chemical form other than metal by the total atomic concentration of Cr and Fe existing in metal chemical form calculated from the separated peaks yields [chemical form other than metal (Cr+Fe)]/[metal chemical form (Cr+Fe)].

In detail, a sample of 10 mm square was cut out of the steel sheet, and measured by an X-ray photoelectron spectrometer (AXIS-HS produced by Shimadzu/Kratos Co.) with an extraction angle of 45 degrees using an Al—Kα monochromatic X-ray source. The peaks of Cr and Fe are separated into the peaks of Cr and Fe existing in metal chemical form and the peaks of Cr and Fe existing in chemical form other than metal. Dividing the total atomic concentration of Cr and Fe existing in chemical form other than metal by the total atomic concentration of Cr and Fe existing in metal chemical form calculated from the separated peaks yields [chemical form other than metal (Cr+Fe)]/[metal chemical form (Cr+Fe)]. Peak separation is performed by removing the background of the spectrum by Shirley method and using a Gauss-Lorentz complex function (proportion of Lorentz function: 30%).

Figure 1:
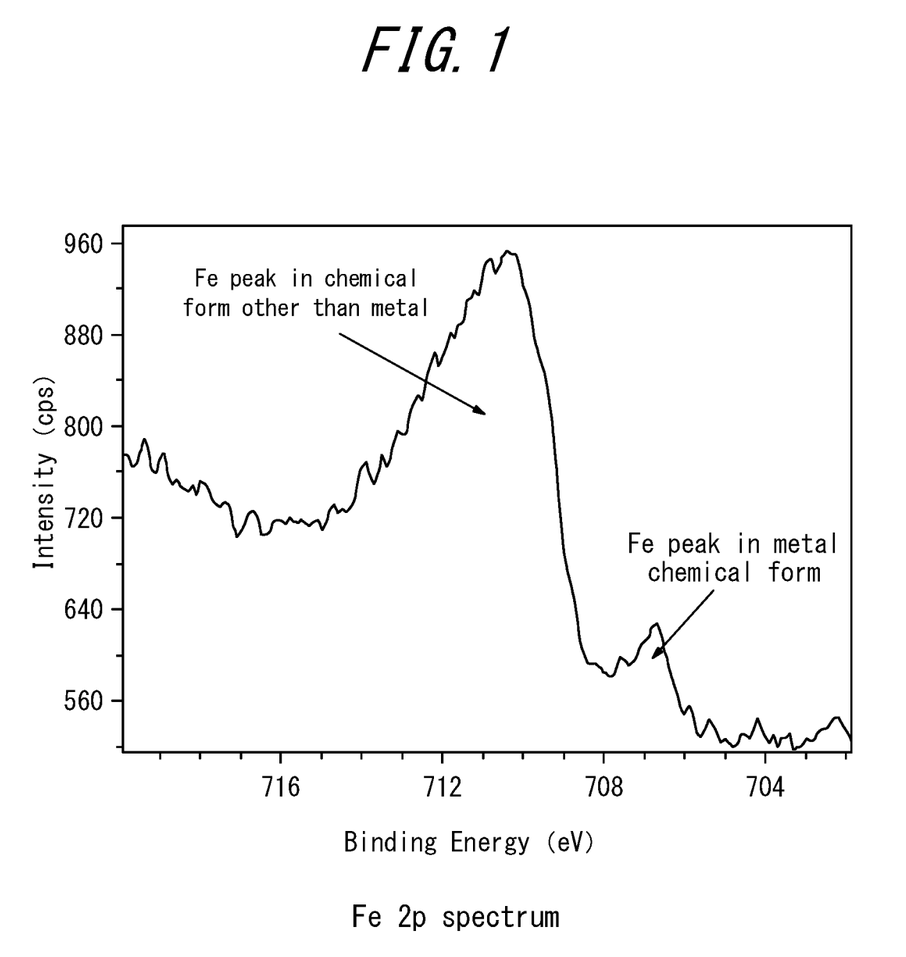
FIG. 1 is a diagram illustrating an example of Fe 2p spectrum by XPS.
Figure 2:
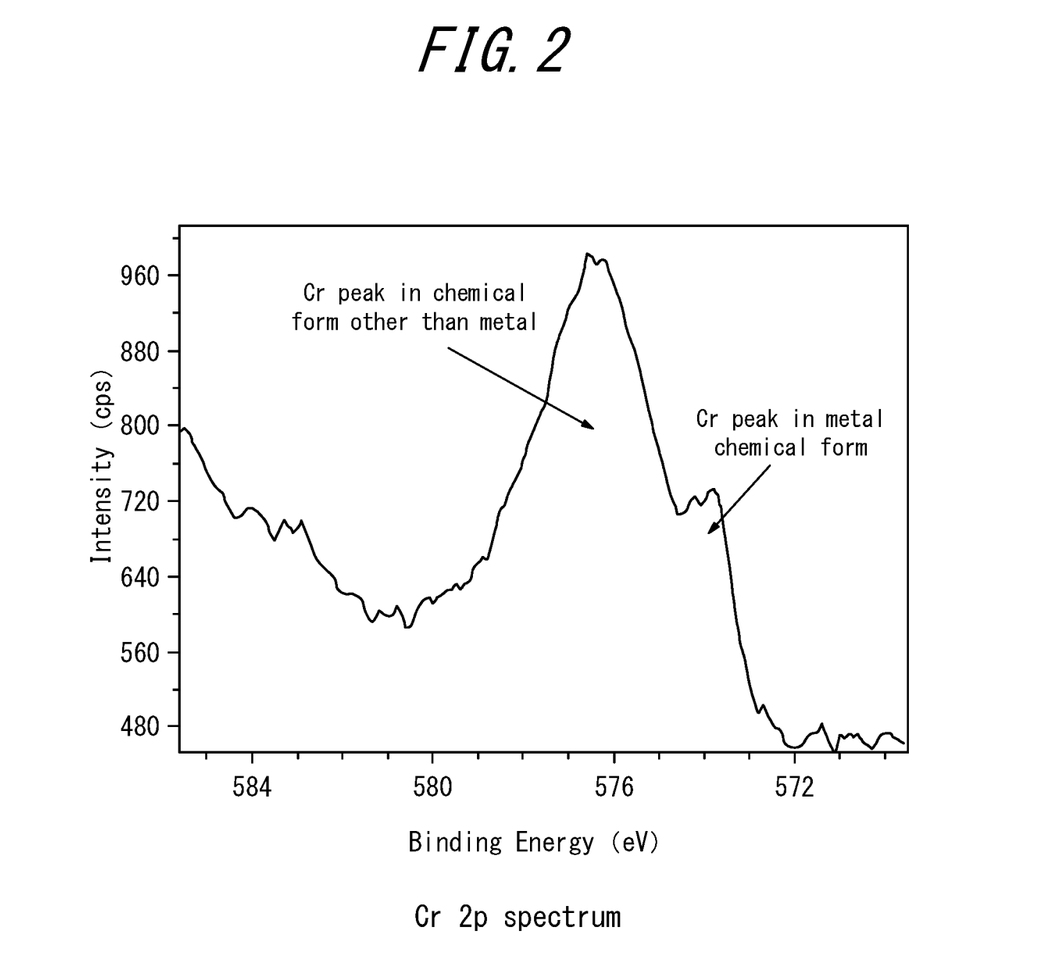
FIG. 2 is a diagram illustrating an example of Cr 2p spectrum by XPS.

For reference, FIG. 1 illustrates an example of Fe 2p spectrum and FIG. 2 illustrates an example of Cr 2p spectrum, by XPS. In FIG. 1, the surface of the substrate stainless steel sheet of sample No. 9 as described below was measured and in FIG. 2, the surface of the substrate stainless steel sheet of sample No. 7 as described below was measured.

In FIG. 1, the peak on the low bonding energy side corresponds to the peak of Fe in metal chemical form and the peak on the high bonding energy side corresponds to the peak of Fe in chemical form other than metal.

In FIG. 2, the peak on the low bonding energy side corresponds to the peak of Cr in metal chemical form and the peak on the high bonding energy side corresponds to the peak of Cr in chemical form other than metal.

In the case that treatment is not performed with a solution containing hydrofluoric acid, F is not detected even if the stainless steel sheet surface is measured by XPS. Therefore, in the presently disclosed stainless steel sheet, the peak of F is not observed even if its surface is measured by XPS.

The chemical composition of the substrate stainless steel sheet is not limited, but the substrate stainless steel sheet preferably has a chemical composition that, in mass %, contains C: 0.100% or less, Si: 2.0% or less, Mn: 2.0% or less, P: 0.050% or less, S: 0.010% or less, Cr: 11.0% to 40.0%, Al: 0.500% or less, and N: 0.100% or less with the balance being Fe and inevitable impurities.

The reason for this is explained below. In the following description, "%" regarding components denotes mass % unless otherwise stated.

C: 0.100% or Less

C reacts with Cr in stainless steel to be precipitated as Cr carbide in grain boundary, which decreases corrosion resistance. Therefore, in terms of corrosion resistance, less C is preferable and the C content is preferably 0.100% or less.

The C content is more preferably 0.030% or less. The C content is further preferably 0.020% or less. No lower limit is particularly placed on the content limit, yet the lower limit is preferably about 0.001%.

Si: 2.0% or Less

Si is an element useful for deoxidation and added at a step of smelting stainless steel. An excessive Si content, however, hardens stainless steel and tends to decrease ductility. Therefore, the Si content is preferably 2.0% or less. The Si content is more preferably 0.60% or less. The lower limit of the Si content is preferably 0.01%.

Mn: 2.0% or Less

Mn is an element useful for deoxidation and added at a step of smelting stainless steel. If the Mn content is more than 2.0%, however, corrosion resistance tends to decrease. Therefore, the Mn content is preferably 2.0% or less. The Mn content is more preferably 1.00% or less. The lower limit of the Mn content is preferably 0.01%.

P: 0.050% or Less

P decreases ductility, and thus, the P content is desirably low. If the P content is 0.050% or less, ductility does not decrease markedly. Therefore, the P content is preferably 0.050% or less. The P content is more preferably 0.040% or less. No lower limit is particularly placed on the content limit, yet the P content is preferably about 0.010% because excessive dephosphorization incurs higher cost.

S: 0.010% or Less

S is an element that combines with Mn to form MnS, decreasing corrosion resistance. If the S content is 0.010% or less, corrosion resistance does not decrease markedly. Therefore, the S content is preferably 0.010% or less. No lower limit is placed on the S content, yet the S content is preferably about 0.001% because excessive desulfurization incurs higher cost.

Cr: 11.0% to 40.0%

The Cr content is preferably 11.0% or more in order to ensure corrosion resistance. If the Cr content is less than 11.0%, the substrate stainless steel sheet has difficulty in withstanding long-term use as fuel cell separators in terms of corrosion resistance. The Cr content is preferably 16.0% or more. If the Cr content is more than 40.0%, toughness may decrease due to precipitation of a σ phase. Therefore, the Cr content is preferably 40.0% or less. The Cr content is more preferably 32.0% or less.

Al: 0.500% or Less

Al is an element which is used for deoxidation. If the Al content is more than 0.500%, however, ductility may decrease. Therefore, the Al content is preferably 0.500% or less. The Al content is more preferably 0.150% or less. The lower limit of the Al content is preferably 0.001%.

N: 0.100% or Less

If the N content is more than 0.100%, formability decreases. Therefore, the N content is preferably 0.100% or less. The N content is more preferably 0.030% or less. The N content is further preferably 0.020% or less. No lower limit is placed on the N content, yet the N content is preferably about 0.002% because excessive denitriding incurs higher cost.

While the basic components have been described above, the presently disclosed substrate stainless steel sheet for fuel cell separators may further contain the following elements in addition to the basic components.

Ni: 30.0% or Less

Ni is an element effective for improving corrosion resistance of stainless steel. Austenitic stainless steel or ferrite-austenite dual phase stainless steel generally contains a fixed amount of Ni. If the Ni content is more than 30.0%, however, hot workability decreases. In the case of the chemical composition containing Ni, the Ni content is therefore 30.0% or less. The lower limit of the Ni content in austenitic stainless steel or ferrite-austenite dual phase stainless steel is preferably 2.0%.

In the case of the chemical composition containing Ni in ferritic stainless steel, the Ni content is preferably 2.0% or less. The Ni content is more preferably 1.0% or less. The lower limit of Ni content in ferritic stainless steel is preferably 0.01%.

Cu: 2.5% or Less.

Cu is an element effective for improving corrosion resistance of stainless steel. If the Cu content is more than 2.5%, however, hot workability decreases, thus compromising productivity. In the case of the chemical composition containing Cu, the Cu content is therefore 2.5% or less. The lower limit of the Cu content is preferably 0.01%.

Mo: 4.0% or Less.

Mo is an element effective for preventing local corrosion such as crevice corrosion of stainless steel. If the Mo content is more than 4.0%, however, stainless steel embrittles. In case of the chemical composition containing Mo, the Mo content is therefore 4.0% or less. The lower limit of the Mo content is preferably 0.01%.

One or More Elements Selected from Nb, Ti, V, and Zr: 1.0% or Less in Total

Nb, Ti, V, and Zr contribute to improved intergranular corrosion resistance, and thus, those elements can be added alone or in combination. In the case that the total content of those elements is more than 1.0%, ductility tends to decrease. In the case of the chemical composition containing Nb, Ti, V, and/or Zr, the total content of those elements is therefore 1.0% or less. The lower limit of the content of those elements is preferably 0.01%.

The components other than those described above are Fe and inevitable impurities.

In terms of the fuel cell stack installation space and weight, the sheet thickness of the substrate stainless steel sheet is preferably in a range of 0.03 mm to 0.30 mm. If the sheet thickness is less than 0.03 mm, the production efficiency of a metal sheet material decreases. If the sheet thickness is more than 0.30 mm, the stack installation space and weight increase. The sheet thickness is more preferably 0.03 mm or more. The sheet thickness is more preferably 0.10 mm or less.

(2) Production Method for Substrate Stainless Steel Sheet for Fuel Cell Separators The presently disclosed production method for a substrate stainless steel sheet for fuel cell separators comprises:

subjecting the stainless steel sheet to heat treatment of holding in an atmosphere containing 1 vol. % or more oxygen and in a temperature range of 350° C. or more to 750° C. or less for 1 second or more and 10 minutes or less to thereby set [chemical form other than metal (Cr+Fe)]/[metal chemical form (Cr+Fe)] at 12.0 or more and 200 or less, [chemical form other than metal (Cr+Fe)]/[metal chemical form (Cr+Fe)] being a ratio of a total of Cr and Fe existing in chemical form other than metal to a total of Cr and Fe existing in metal form at a stainless steel sheet surface.

Preparation

The preparation involves preparing a stainless steel sheet as a material. The stainless steel sheet as a material is not limited and includes a stainless steel sheet having the preferable chemical composition described above.

For example, a stainless steel sheet having the chemical composition described above can be prepared by hot rolling a steel slab having the chemical composition described above to obtain a hot rolled sheet, optionally subjecting the hot-rolled sheet to hot-rolled sheet annealing, thereafter cold rolling the hot rolled sheet to obtain a cold-rolled sheet with a desired sheet thickness, and further optionally subjecting the cold rolled sheet to cold-rolled sheet annealing.

The conditions of hot rolling, cold rolling, hot-rolled sheet annealing, cold-rolled sheet annealing, and the like are not limited, and may comply with conventional methods. After cold-rolled sheet annealing, the stainless steel sheet may be subjected to pickling and skin pass. A stainless steel sheet prepared by bright annealing instead of cold-rolled sheet annealing can be also used.

The stainless steel sheet obtained as described above may be further subjected to treatment of roughing the surface by, for example, shot blasting or to treatment of smoothing the surface by, for example, mechanical polishing. The stainless steel sheet obtained after cold-rolled sheet annealing may be subjected to, for example, electrolytic treatment and acid treatment.

Heat Treatment

The heat treatment involves subjecting the stainless steel sheet material prepared in the preparation to heat treatment under predetermined conditions to set a ratio [chemical form other than metal (Cr+Fe)]/[metal form (Cr+Fe)] of a total of Cr and Fe existing in chemical form other than metal to a total of Cr and Fe existing in metal form at the stainless steel sheet surface at 12.0 or more and 200 or less.

The reasons for the limitations on each condition in heat treatment are described below.

Heat Treatment Atmosphere: Atmosphere Containing 1 vol. % or More Oxygen

The atmosphere in heat treatment is an atmosphere containing 1 vol. % or more oxygen. If the oxygen concentration is less than 1 vol. %, a desired surface layer cannot be formed on a stainless steel surface.

Examples of atmosphere gas other than oxygen include atmosphere gas having oxygen on a molecular configuration such as carbon dioxide and water vapor. Atmosphere gas is preferably an air atmosphere, considering cost and manufacturability. An atmosphere having only inert gas such as nitrogen and argon does not have desired properties.

Heat Treatment Temperature: 350° C. or More and 750° C. or Less

If the heat treatment temperature is less than 350° C., the stainless steel has a surface layer of insufficient thickness formed on its surface and desired corrosion resistance cannot be obtained. If the heat treatment temperature is more than 750° C., the stainless steel sheet has an excessively thick surface layer formed on its surface and desired contact resistance cannot be ensured.

The heat treatment temperature is therefore 350° C. or more and 750° C. or less. In particular, if the Cr content of the stainless steel sheet as a material (material to be treated) is less than 25 mass %, the heat treatment temperature is preferably 400° C. or more. If the Cr content of the stainless steel sheet as a material is 25 mass % or more, the heat treatment temperature is preferably 450° C. or more.

Heat Treatment Time: 1 Second or More and 10 Minutes or Less

If the heat treatment time is less than 1 second, the stainless steel has a surface layer of insufficient thickness formed on its surface and desired corrosion resistance cannot be obtained. If the heat treatment time is more than 10 minutes, the stainless steel sheet has an excessively thick surface layer formed on its surface and desired contact resistance cannot be ensured.

The heat treatment time is therefore 1 second or more and 10 minutes or less. The heat treatment time is preferably 5 minutes or less. The heat treatment time is more preferably 1 minute or less.

The heat treatment conditions other than the above are not limited, and may use conventional methods.

The above heat treatment may be performed after a steel sheet is press formed into a desired shape in a separator production process. If the heat treatment does not change the quality of a conductive coating to harm desired properties, the heat treatment may be performed after a conductive coating is overlaid.

Treatment with hydrofluoric acid, which requires, for example, the use of a treatment solution containing high-concentration fluorine ion, makes it very difficult in terms of safety to control [chemical form other than metal (Cr+Fe)]/[metal form (Cr+Fe)] in a range of 12.0 or more to 200 or less.

(3) Conductive Coating

The presently disclosed substrate stainless steel sheet for fuel cell separators is a stainless steel sheet serving as a substrate of a conductive coating. In the case that the substrate stainless steel sheet is actually used as fuel cell separators, the conductive coating is formed on its surface.

Such a conductive coating is not limited, but it is preferable to use a material which has excellent conductivity in a use environment of polymer electrolyte fuel cell separators (ph: 3 (sulfuric acid environment), and use temperature: 80° C.). For example, a metal layer, a metal carbide layer, a metal nitride layer, a carbon material layer, a conductive polymer layer, an organic resin layer containing a conductive substance, or a mixed layer thereof is suitable.

Examples of the metal layer include metal layers of Au, Ag, Cu, Pt, Pd, W, Sn, Ti, Al, Zr, Nb, Ta, Ru, Ir, and Ni. A metal layer of Au is particularly suitable.

Examples of the metal nitride layer and the metal carbide layer include metal nitride layers and metal carbide layers of TiN, CrN, TiCN, TiAlN, AlCrN, TiC, WC, SiC, $B_4C$, molybdenum nitride, CrC, TaC, and ZrN. Metal nitride layers of TiN and CrN are particularly suitable.

Examples of the carbon material layer include carbon material layers of graphite, diamond, amorphous carbon, diamond-like carbon, carbon black, fullerene, and carbon nanotube.

Examples of the conductive polymer layer include conductive polymer layers of polyaniline and polypyrrole.

The organic resin layer containing a conductive substance contains at least one conductive substance selected from a metal, an alloy, a metal nitride, a metal carbide, a carbon material, and a conductive polymer included in the aforementioned metal layer, alloy layer, metal nitride layer, metal carbide layer, carbon material layer, and conductive polymer layer, and contains at least one organic resin selected from epoxy resin, phenol resin, polyamide-imide resin, polyester resin, polyphenylene sulfide resin, polyamide resin, urethane resin, acrylic resin, polyethylene resin, polypropylene resin, carbodiimide resin, phenol epoxy resin, and the like. As the organic resin layer containing a conductive substance, for example, carbon black-dispersed epoxy resin is suitable.

As the conductive substance, a metal and a carbon material (in particular, graphite, carbon black) are suitable. The content of the conductive substance is not limited, as long as predetermined conductivity is obtained in polymer electrolyte fuel cell separators.

For the formation of the conductive coating on the substrate stainless steel sheet surface, a method such as plating, physical vapor deposition (PVD), chemical vapor deposition (CVD), electrodeposition, thermal spraying, surface melting treatment, or coating may be used depending on the type of the conductive coating to be formed.

For example, in the case of providing the conductive coating that is the metal layer, plating is suitable. In this case, by a conventionally known plating method the substrate stainless steel sheet is immersed in a plating bath adjusted to a predetermined composition and subjected to electroplating, electroless plating, or hot dip coating. PVD is also suitable. The thickness of such a conductive coating that is the metal layer is preferably in a range of 0.001 μm to 1 μm. If the thickness of the conductive coating is less than 0.001 μm, desired contact resistance is difficult to be obtained. If the thickness of the conductive coating is more than 1 μm, the coating cost increases while manufacturability decreases. The thickness of the conductive coating is more preferably 0.01 μm or more. The thickness of the conductive coating is more preferably 0.5 μm or less.

In the case of providing, the metal nitride layer, the metal carbide layer, and the carbon material layer, physical vapor deposition (PVD) or chemical vapor deposition (CVD) is suitable. The thickness of such a conductive coating is preferably in a range of 0.001 μm to 1 μm, for the same reason as above.

In the case of providing the conductive polymer layer, electropolymerization is suitable. The thickness of such a conductive coating is preferably in a range of 0.1 μm to 5 μm, for the same reason as above.

In the case of providing the organic resin layer containing a conductive substance, coating (a method of applying a predetermined coating solution and then firing) is suitable. The thickness of such a conductive coating is preferably in a range of 1 μm to 50 μm, for the same reason as above. The thickness of the conductive coating is more preferably 1 μm or more. The thickness of the conductive coating is more preferably 10 μm or less.

EXAMPLES

Example 1

Stainless steel sheets (cold-rolled and annealed sheets) of 0.10 mm in sheet thickness having compositions listed in Table 1 (the balance consists of Fe and inevitable impurities) were prepared, and subjected to heat treatment under the conditions listed in Table 2 to thereby obtain various kinds of substrate stainless steel sheets. Samples No. 7 and 8 of Table 2 were not subjected to heat treatment for comparison (the "%" of the fields of atmosphere of Table 2 denotes vol. %).

The substrate stainless steel sheet surface was analyzed by X-ray photoelectron spectroscopy (hereafter also referred to as "XPS") in accordance with the aforementioned method to calculate [chemical form other than metal (Cr+Fe)]/[metal chemical form (Cr+Fe)] which is a ratio of a total of Cr and Fe existing in chemical form other than metal to a total of Cr and Fe existing in metal chemical form at the stainless steel sheet surface. The results are listed in Table 2. The F peak was not observed in any stainless steel sheet.

A conductive coating was then formed on the substrate stainless steel sheet surface to the thickness listed in Table 2 o obtain steel sheets for fuel cell separators.

The conductive coating of Au was formed by vapor deposition. For the metal nitride layer (TiN), the conductive coating was formed by physical vapor deposition (PVD). For the carbon material layer (diamond-strike carbon), the conductive coating was formed by chemical vapor deposition (CVD). For the conductive polymer layer (polyaniline), the conductive coating was formed by electropolymerization. For the organic resin layer containing a conductive substance (carbon black-dispersed epoxy resin and graphite-dispersed phenol resin), the conductive coating was formed by applying a predetermined coating solution and then firing. The carbon black-dispersed epoxy resin was obtained by dispersing carbon black particles with an average particle size of 50 nm in epoxy resin in a proportion of 20 mass %.

As described above, polymer electrolyte fuel cell separators are used in a severe corrosion environment of about 80° C. in temperature and 3 in pH, and therefore excellent corrosion resistance is required. At the same time, low contact resistance is also required.

In view of these required properties, predetermined samples were collected from the obtained steel sheets for fuel cell separators and the following types of evaluation were conducted.

(1) Evaluation of Corrosion Resistance (Stability in Separator Use Environment)

Each sample was immersed in a sulfuric acid aqueous solution of a temperature of 80° C. and a pH of 3 and subjected to the application of a constant potential of 0.9 V (vs. SHE) for 5 hours using Ag/AgCl (saturated KCl aqueous solution) as a reference electrode to simulate separator use at high potential, and the total electric charge conducted for 5 hours was measured. Based on the total electric charge conducted for 5 hours, the corrosion resistance after 5 hours in the separator use environment was evaluated by the following criteria. The results are listed in Table 2.

Excellent: less than 2.0 mC/cm$^2$
Good: 2.0 mC/cm$^2$ or more and 6.0 mC/cm$^2$ or less
Poor: more than 6.0 mC/cm$^2$ (2) Evaluation of Contact Resistance Regarding the contact resistance, a sample was sandwiched between sheets of carbon paper (TGP-H-120 produced by Toray Industries, Inc.), and further contacted from both sides by Au plated Cu electrodes. A pressure of 0.98 MPa (=10 kg/cm$^2$) per unit area was applied to cause current to flow, and the voltage difference between the electrodes was measured to calculate the electric resistance. The value obtained by multiplying the measured electric resistance by the area of the contact surface was taken to be the contact resistance value, and the contact resistance was evaluated based on the following criteria. The results are listed in Table 2.

Good: 20 mΩ·cm$^2$ or less
Poor: more than 20 mΩ·cm$^2$

TABLE 1

| Steel sample ID | Chemical composition (mass %) | | | | | | | | | | | |
|---|---|---|---|---|---|---|---|---|---|---|---|---|
| | C | Si | Mn | P | S | Cr | Al | N | Ni | Cu | Mo | Other components |
| A | 0.005 | 0.18 | 0.16 | 0.026 | 0.007 | 30.3 | 0.079 | 0.012 | 0.22 | — | 1.80 | Nb: 0.14 |
| B | 0.009 | 0.14 | 0.18 | 0.027 | 0.002 | 20.8 | 0.033 | 0.009 | 0.21 | 0.43 | 0.06 | Ti: 0.29 |

TABLE 1-continued

| Steel sample ID | Chemical composition (mass %) | | | | | | | | | | | |
|---|---|---|---|---|---|---|---|---|---|---|---|---|
| | C | Si | Mn | P | S | Cr | Al | N | Ni | Cu | Mo | Other components |
| C | 0.018 | 0.68 | 1.01 | 0.040 | 0.004 | 17.8 | 0.002 | 0.027 | 12.04 | 0.44 | 2.05 | — |
| D | 0.005 | 0.39 | 0.21 | 0.031 | 0.006 | 18.8 | 0.003 | 0.008 | 0.31 | — | 1.88 | Nb: 0.35 |
| E | 0.005 | 0.19 | 0.23 | 0.027 | 0.006 | 23.1 | 0.022 | 0.011 | 0.29 | — | 1.12 | Nb: 0.39 |
| F | 0.006 | 0.35 | 0.21 | 0.029 | 0.005 | 19.3 | 0.004 | 0.007 | 0.13 | 0.04 | 1.90 | Nb: 0.31, Zr: 0.03, V: 0.06 |

TABLE 2

| Samples No. | Steel samples ID | Sample production conditions Heat treatment conditions | | | [chemical form other than metal (Cr + Fe)]/[metal chemical form (Cr + Fe)] | Conductive coating | | Total electric charge conducted for 5 hours (mC/cm²) | Contact resistance (mΩ·cm²) | Evaluation result | | Remarks |
|---|---|---|---|---|---|---|---|---|---|---|---|---|
| | | Atmosphere | Temperature (°C.) | Time (sec) | | Coating type | Thickness (μm) | | | Corrosion resistance | Contact resistance | |
| 1 | A | Air | 350 | 600 | 29.3 | Carbon black-dispersed epoxy resin | 5 | 2.0 | 13.4 | Good | Good | Example |
| 2 | A | Air | 400 | 30 | 22.6 | Au | 0.02 | 5.1 | 11.2 | Good | Good | Example |
| 3 | A | Air | 400 | 30 | 22.6 | Carbon black-dispersed epoxy resin | 5 | 4.1 | 12.8 | Good | Good | Example |
| 4 | A | Air | 750 | 3 | 87.4 | Carbon black-dispersed epoxy resin | 5 | 0.3 | 15.9 | Excellent | Good | Example |
| 5 | B | Air | 400 | 30 | 75.2 | Carbon black-dispersed epoxy resin | 5 | 0.3 | 15.4 | Excellent | Good | Example |
| 6 | C | Air | 400 | 30 | 105.4 | Carbon black-dispersed epoxy resin | 5 | 0.6 | 16.2 | Excellent | Good | Example |
| 7 | A | — | — | — | 3.5 | Au | 0.02 | 11.5 | 9.8 | Poor | Good | Comparative Example |
| 8 | A | — | — | — | 3.5 | Carbon black-dispersed epoxy resin | 5 | 9.4 | 11.4 | Poor | Good | Comparative Example |
| 9 | A | Air | 300 | 300 | 11.6 | Au | 0.02 | 10.0 | 10.4 | Poor | Good | Comparative Example |
| 10 | A | Air | 300 | 300 | 11.6 | Carbon black-dispersed epoxy resin | 5 | 8.4 | 12.1 | Poor | Good | Comparative Example |
| 11 | D | Air | 400 | 30 | 83.4 | Au | 0.02 | 1.6 | 12.1 | Excellent | Good | Example |
| 12 | E | Air | 400 | 30 | 55.8 | Au | 0.02 | 1.9 | 11.9 | Excellent | Good | Example |
| 13 | F | Air | 400 | 30 | 79.2 | Au | 0.02 | 1.7 | 12.1 | Excellent | Good | Example |
| 14 | A | Air | 500 | 1 | 41.1 | Au | 0.02 | 1.3 | 11.8 | Excellent | Good | Example |
| 15 | A | 1% oxigen + 99% nitrogen | 500 | 30 | 23.6 | Au | 0.02 | 3.3 | 11.4 | Good | Good | Example |
| 16 | A | 10% water vapor + 90% air | 450 | 30 | 35.4 | Au | 0.02 | 1.8 | 11.3 | Excellent | Good | Example |
| 17 | A | Air | 350 | 100 | 22.6 | Diamond-like carbon | 0.3 | 4.2 | 12.6 | Good | Good | Example |
| 18 | A | Air | 350 | 100 | 22.6 | TN | 0.1 | 5.1 | 13.2 | Good | Good | Example |
| 19 | A | Air | 350 | 100 | 22.6 | Polyaniline | 1 | 4.9 | 17.1 | Good | Good | Example |
| 20 | A | Air | 450 | 120 | 40.1 | Graphite-dispersed phenol resin | 5 | 1.8 | 13.7 | Excellent | Good | Example |
| 21 | A | 100% Ar | 400 | 30 | 3.8 | Au | 0.02 | 11.4 | 10.0 | Poor | Good | Comparative Example |

Table 2 reveals the following points.

(a) All Examples had desired contact resistance and corrosion resistance.

(b) The samples of Comparative Examples No. 7 and 8, which were subjected to no heat treatment, had [chemical form other than metal (Cr+Fe)]/[metal chemical form (Cr+Fe)] of less than 12.0 and had no desired corrosion resistance.

(c) The samples of Comparative Examples No. 9 and 10, which were subjected to heat treatment at low temperature, had [chemical form other than metal (Cr+Fe)]/[metal chemical form (Cr+Fe)] of less than 12.0 and had no desired corrosion resistance.

(d) The sample of Comparative Example No. 21, which was subjected to heat treatment in an Ar atmosphere containing less than 1 vol. % oxygen, had [chemical form other than metal (Cr+Fe)]/[metal chemical form (Cr+Fe)] of less than 12.0 and had no desired corrosion resistance.

The invention claimed is:

1. A production method for a substrate stainless steel sheet for fuel cell separators, comprising:
preparing a stainless steel sheet as a material; and
subjecting the stainless steel sheet to heat treatment of holding in an atmosphere containing 1 vol. % or more oxygen and in a temperature range of 350° C. or more to 500° C. or less for 1 second or more and 120 seconds or less to thereby set [chemical form other than metal (Cr+Fe)]/[metal chemical form (Cr+Fe)] at 12.0 or more and 200 or less, [chemical form other than metal (Cr+Fe)]/[metal chemical form (Cr+Fe)] being a ratio of a total of Cr and Fe existing in chemical form other than metal to a total of Cr and Fe existing in metal chemical form at a stainless steel sheet surface,
wherein [metal chemical form (Cr+Fe)] is a total atomic concentration of Cr and Fe existing in metal chemical form and [chemical form other than metal (Cr+Fe)] is a total atomic concentration of Cr and Fe existing in chemical form other than metal, which are measured by analyzing the stainless steel sheet surface after heat treatment by X-ray photoelectron spectroscopy, and
wherein the substrate stainless steel sheet is in a state before a conductive coating is formed on its surface.

2. The production method according to claim 1, wherein the temperature range of the heat treatment is 350° C. or more to 450° C. or less.

3. The production method according to claim 1, wherein the substrate stainless steel sheet does not have the conductive coating on its surface.

4. The production method according to claim 2, wherein the substrate stainless steel sheet does not have the conductive coating on its surface.

5. The production method according to claim 1, wherein a heat treatment time of the heat treatment is 1 second or more and 1 minute or less.

6. The production method according to claim 2, wherein a heat treatment time of the heat treatment is 1 second or more and 1 minute or less.

7. The production method according to claim 3, wherein a heat treatment time of the heat treatment is 1 second or more and 1 minute or less.

8. The production method according to claim 4, wherein a heat treatment time of the heat treatment is 1 second or more and 1 minute or less.

* * * * *

UNITED STATES PATENT AND TRADEMARK OFFICE
CERTIFICATE OF CORRECTION

PATENT NO. : 11,380,907 B2
APPLICATION NO. : 16/483147
DATED : July 5, 2022
INVENTOR(S) : Takayoshi Yano et al.

It is certified that error appears in the above-identified patent and that said Letters Patent is hereby corrected as shown below:

On the Title Page

Please insert the following information as item (73) (Assignee):
--JFE STEEL CORPORATION, Tokyo (JP)--

Signed and Sealed this
Twentieth Day of December, 2022

Katherine Kelly Vidal
Director of the United States Patent and Trademark Office